Feb. 19, 1929.     W. M. BLISS     1,702,859

VEHICLE SIGNAL

Filed Feb. 17, 1926

Inventor:
Willard M. Bliss
By Monroe L. Miller
Attorney

Patented Feb. 19, 1929.

1,702,859

UNITED STATES PATENT OFFICE.

WILLARD M. BLISS, OF BROOKLYN, NEW YORK.

VEHICLE SIGNAL.

Application filed February 17, 1926. Serial No. 88,939.

The present invention relates to vehicle signals, and aims to provide a novel and improved signal device for an automobile, motor truck, bus, or the like, arranged to be operated by one of the foot levers, such as the brake pedal or clutch pedal lever, in order that a signal is given when the lever is operated, so as to warn or inform others of the intention of the driver of the vehicle to stop or turn.

A further object of the invention is the provision of novel means for operably connecting the signal arm or member and the foot lever, in order that when the foot lever is operated the signal member is moved to signalling position.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
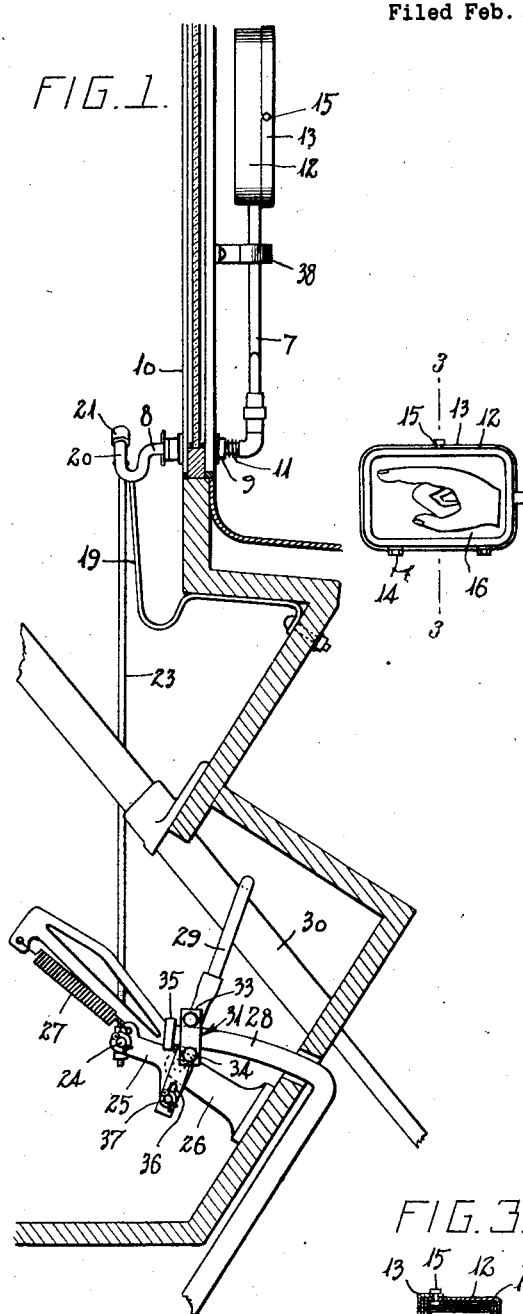
Figure 1 is a side elevation of the signal device, with the signal member in normal idle position, fragmentary portions of an automobile being shown.

The signal arm 7 has a journal portion 8 mounted for rotation in a bearing 9 that is secured through the front corner post or upright 10 of the body of a closed automobile, although it will be understood that such bearing may be secured to the body or windshield support of an automobile, motor truck, bus, or other vehicle, in any suitable manner. A coiled spring 11 surrounds the portion 8 and is confined between the bearing 9 and arm 7 to provide friction between the arm and bearing tending to hold the arm in the position to which it is swung, and the spring also eliminates vibration or rattling between the arm and bearing.

Figure 2:
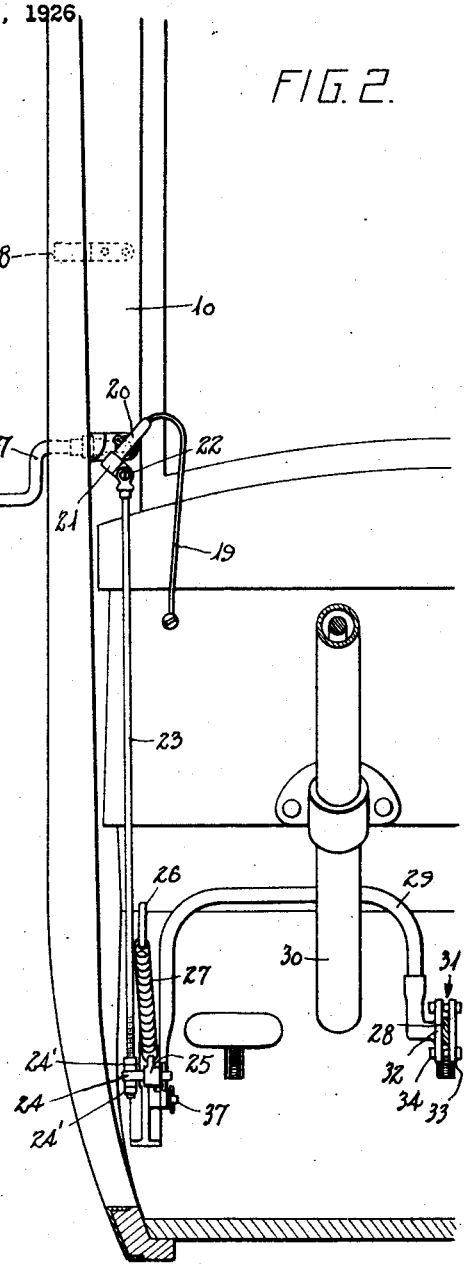
Fig. 2 is a rear view of the device with the signal member in signalling position.
Figure 3:
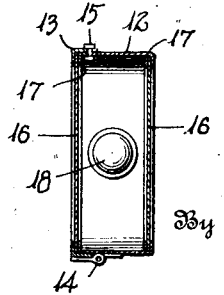
Fig. 3 is an enlarged cross section on the line 3—3 of Fig. 2.

The arm 7 carries the signal member which comprises a case 12 of sheet metal or other suitable material, having a section 13 hinged, as at 14, to enable the case to be opened, the section 13 being held closed by any suitable securing or latching means 15. The section 13 and opposite side of the case have panels 16 of glass, celluloid, or other suitable material containing a suitable index, such as the representation of a hand pointing toward the left, as shown in Fig. 2. The panels 16 are secured in place in any suitable manner, such as by means of retaining frames 17 secured within the section 13 and case 12. In order to illuminate the panels 16 during darkness, an electric lamp bulb 18 is carried by the end of the arm 7 within the case, and said arm is composed of tubular stock, so that the electric wire or wires 19 may extend through said arm.

The portion 8 has an arm 20 at its rear end, so that the arm 7 forms with the arm 20 a lever carrying the signal member. A split collar or pinch clamp 21 embraces the arm 20 and has a screw or bolt 22 for clamping it on said arm in different adjusted positions, and said clamping element 22 also serves as a pivot for the upper end of a rod 23. The lower terminal of said rod extends through a pivot element 24 mounted for pivotal movement in one arm of a lever 25 that is fulcrumed to an upstanding bracket or standard 26 secured to the footboard of the vehicle body. Nuts 24' are threaded on the rod 23 above and below the pivot member 24 to provide an adjustable connection between the rod 23 and lever 25. A coiled spring 27 is connected to the lever 25 and the bracket 26, for swinging said lever so as to raise the rod 23 and arm 20, thereby swinging the arm 7 upwardly to move the signal member to its normal idle position, as seen in Fig. 1, with the arm 7 projecting upwardly in front of the post 10.

The signal member is operated from the brake lever 28, as shown, although it may be similarly operated by the clutch lever. An arch or yoke 29 is provided that extends over or across the steering column 30, the lever 28 being located to the right of the column and the bracket 26 to the left of said column adjacent to the left side of the vehicle body. Thus, the connection between the levers 28 and 25 will not obstruct the clutch pedal and will not interfere with the clutch pedal or steering column. At its right hand end the arch or member 29 has a clamp 31 to embrace the lever 28. Thus, a clamping plate 32 is carried by the end of the arch 29 and a cooperating clamping plate 33 is connected to the plate 32 by bolts or screws 34 to clamp the lever 28 between said plates in rear of the foot pedal 35 of the lever. The arch or member 29 will therefore swing with the foot lever 28. The left hand terminal of the arch 29 has a slot 36 receiving a pivot pin or element 37 carried by the lever 25, so that when the pedal 28 is swung by the foot to apply the brakes, the arch or member 29 will swing the lever 25 so as to pull the rod 23 downwardly and swing the signal member to signalling position, as seen in Fig. 2. When the foot lever is released the spring 27 will restore the signal member to normal idle position, and the arm 7 swings against a stop 38 carried by the post or support 10.

With the present signal device, the signal member is moved to signalling position, to give a signal to other traffic, that it is the intention of the driver to stop or turn. The operation of the device is automatic inasmuch as when the driver operates the foot lever to apply the brakes, the signal member is automatically swung downwardly and outwardly to signalling position, as seen in Fig. 2, and when the brakes are released the signal member is restored to idle position.

The mechanism is simple so as to be inexpensive in manufacture, and may also be readily installed.

Having thus described the invention, what is claimed as new is:—

The combination with the foot board of an automobile and a foot lever movable through said foot board, of means for transmitting motion from said lever comprising a bracket secured on said foot board at one side of said lever, an arched rod having a clamp at one end rigidly embracing said foot lever, a lever fulcrumed to said bracket, the secondnamed lever and other terminal of the rod having a pin and slot connection, and a rod connected with the secondnamed lever to transmit motion therefrom.

In testimony whereof I hereunto affix my signature.

WILLARD M. BLISS.